US011044577B2

(12) United States Patent
Kersch et al.

(10) Patent No.: US 11,044,577 B2
(45) Date of Patent: Jun. 22, 2021

(54) TECHNIQUE FOR GENERATING NEAR REAL-TIME TRANSPORT MODALITY STATISTICS

(71) Applicant: Telefonaktiebolaget LM Ericsson (publ), Stockholm (SE)

(72) Inventors: Péter Kersch, Budapest (HU); Attila Körösi, Budapest (HU); László Toka, Budapest (HU)

(73) Assignee: Telefonaktiebolaget LM Ericsson (publ), Stockholm (SE)

( * ) Notice: Subject to any disclaimer, the term of this patent is extended or adjusted under 35 U.S.C. 154(b) by 77 days.

(21) Appl. No.: 16/479,666

(22) PCT Filed: Oct. 25, 2017

(86) PCT No.: PCT/EP2017/077225
§ 371 (c)(1),
(2) Date: Jul. 22, 2019

(87) PCT Pub. No.: WO2018/157955
PCT Pub. Date: Sep. 7, 2018

(65) Prior Publication Data
US 2021/0029492 A1    Jan. 28, 2021

Related U.S. Application Data

(60) Provisional application No. 62/465,464, filed on Mar. 1, 2017.

(51) Int. Cl.
*H04W 4/02* (2018.01)
*H04W 4/42* (2018.01)
(Continued)

(52) U.S. Cl.
CPC .............. *H04W 4/023* (2013.01); *G08G 1/20* (2013.01); *H04W 4/029* (2018.02); *H04W 4/42* (2018.02)

(58) Field of Classification Search
None
See application file for complete search history.

(56) References Cited

U.S. PATENT DOCUMENTS 8,838,134 B2    9/2014  Martinez et al.
2010/0197325 A1* 8/2010  Dredge ................... H04L 67/18
                                                                              455/456.3

(Continued)

FOREIGN PATENT DOCUMENTS

EP    2608179 A1    6/2013
EP    2608181 A1    6/2013
EP    3031043 B1    8/2017

OTHER PUBLICATIONS

Albrecht, T. et al., "A Precise and Reliable Train Positioning System and its Use for Automation of Train Operation", 2013 IEEE International Conference on Intelligent Rail Transportation Proceedings, Aug. 30, 2013, pp. 1-6, IEEE.

(Continued)

*Primary Examiner* — Adolf Dsouza
(74) *Attorney, Agent, or Firm* — Coats + Bennett, PLLC

(57) ABSTRACT

Methods and apparatuses for generating real-time or near-real-time transport modality statistics by correlating mobile network and public transport location data are provided. In an example, a processing node may perform a method using one or more processing circuits, the method including identifying paths traveled by multiple vehicles and determining paths traveled by multiple subscriber telecommunications devices of one or more network or service providers. In addition, the method may include correlating the paths traveled by the multiple vehicles and the paths traveled by the multiple subscriber telecommunications devices to determine which one or more modes of transportation each subscriber telecommunications device used over the path traveled by the subscriber telecommunications device. Cor- (Continued)

responding apparatus, computer programs, and signals are also described.

19 Claims, 12 Drawing Sheets

(51) Int. Cl.
*H04W 4/029* (2018.01)
*G08G 1/00* (2006.01)

(56) References Cited

U.S. PATENT DOCUMENTS

| | | |
|---|---|---|
| 2013/0183927 A1 | 7/2013 | Scarr et al. |
| 2015/0176997 A1* | 6/2015 | Pursche ............. G01C 21/3492 340/905 |
| 2015/0271727 A1 | 9/2015 | Harrang |
| 2016/0078762 A1* | 3/2016 | Jouaux .................. G08G 1/123 701/117 |

OTHER PUBLICATIONS

Google Developers, "Google Transit APIs", Aug. 26, 2016, pp. 1-3, retrieved on Sep. 12, 2017, retrieved from internet: https://developers.google.com/transit/gtfs-realtime/.

Lortaisong, A. et al., "Handover Position Estimation on Cellular Probe Data for a Novel Postioning Scheme", 2012 8th International Conference on Computing and Networking Technology (INC, ICCIS and ICMIC), Aug. 27, 2012, pp. 380-384, IEEE.

Zhou, P. et al., "How Long to Wait? Predicting Bus Arrival Time With Mobile Phone Based Participatory Sensing", IEEE Transactions on Mobile Computing, vol. 13 No. 6, Jun. 1, 2014, pp. 1228-1241, IEEE.

Di Lorenzo, G. et al., "AllAboard: Visual Exploration of Cellphone Mobility Data to Optimise Public Transport", IEEE Transactions on Visualization and Computer Graphics, vol. 22 No. 2, Feb. 1, 2016, pp. 1036-1050, IEEE.

Google Developers, "GTFS Realtime Overview", Jul. 3, 2019, pp. 1-4, retrieved on Jul. 16, 2019, retrieved from internet: https://developers.google.com/transit/gtfs-realtime/.

Reach-U, "Urban Planning Application", pp. 1-2, retrieved on Jul. 16, 2019, retrieved from internet: https://www.reach-u.com/urban-planning-application.html.

Eland, A., "Tackling Urban Mobility with Technology", Google Europe Blog, Nov. 18, 2015, pp. 1-4, retrieved on Jul. 16, 2019, retrieved from: https://europe.googleblog.com/2015/11/tackling-urban-mobility-with-technology.html.

Poonawala, H. et al., "Singapore in Motion: Insights on Public Transport Service Level Through Farecard and Mobile Data Analytics", 22nd ACM SIGKDD Conference on Knowledge Discovery and Data Mining, Aug. 13, 2016, pp. 1-10, ACM.

* cited by examiner

TECHNIQUE FOR GENERATING NEAR REAL-TIME TRANSPORT MODALITY STATISTICS

TECHNICAL FIELD

The present application generally relates to wireless subscriber location analysis, and particularly relates to generating transport modality statistics for wireless subscribers by correlating mobile subscriber telecommunication device and vehicle location data.

BACKGROUND

In order to efficiently plan and optimize public transport systems in big cities, a vast amount of user-specific mobility data is required. Such data has traditionally been collected by surveying a small percentage of households and by manually counting passengers on each transportation line or vehicle. This remains the most used approach today in most cities.

Recently, a number of information technology solutions have emerged. For instance, electronic ticketing systems, which are being deployed in more and more cities (e.g., New York, Tokyo, Shanghai, etc.), provide detailed and accurate information about public transport usage. Several solutions built on mobility information from mobile networks are in development, including some that build origin-destination matrices from mobile network data and then utilize these matrices to optimize public transport planning and usage. Smartphones are also aware of user (also referred to herein as "subscriber") location from global positioning system (GPS) and/or mobile network cell information, and as such, major service providers and platform vendors possess large mobility data sets from which mobility statistics can be derived.

There are downsides, however, to each of these existing solutions. Traditional household surveys and manual passenger counting are each expensive (both monetarily and in terms of human work involved) and quite inaccurate (only cover a very small subset of citizens and time periods). Electronic ticketing systems, though providing detailed passenger use data, are expensive to build and do not provide any information about other modes of transport (also referred to as "modality" or "modalities") such as walking, bicycles, cars, etc. Also, some of these systems are "check-in only" to simplify usage, i.e., data is logged only when boarding a vehicle. These "check-in only" systems provide much less accurate statistics than the ones where check-out is also mandatory.

With the current high mobile phone usage rates, telecom data can cover mobility patterns of practically all citizens. However, all of the currently published systems are using circuit-switched call data records (CDRs) only, which contain location information only in point in times when a user is making voice calls or sending or receiving text or multimedia messages. These current methods provide infrequent and incomplete mobility information, requiring long time periods (i.e., several weeks or months) to render reliable origin-destination matrix estimates. Hence, these existing methods can provide only long-term average traffic characteristics not suitable to identify shorter term (second- or minute-wise, i.e., near-real-time, hourly, daily) dynamic changes in mobility patterns due to road works, line reconstructions, replacement services, events, and the like. Finally, modality information (i.e., transport means being used) is not possible to extract using the currently used data.

Accordingly, improved techniques for providing user mobility data and utilizing that data to generate user modality information are needed.

SUMMARY

The present disclosure describes example methods and apparatuses for generating real-time or near-real-time transport modality statistics by correlating mobile network and public transport location data. In an example method, a processing node may, using one or more processing apparatuses, identify paths traveled by multiple vehicles and determine paths traveled by multiple subscriber telecommunications devices of one or more network or service providers. In addition, the processing node may utilize the one or more processing apparatuses to correlate the paths traveled by the multiple vehicles and the paths traveled by the multiple subscriber telecommunications devices to determine which one or more modes of transportation each subscriber telecommunications device used over the path traveled by the subscriber telecommunications device.

Corresponding apparatus, computer programs, and signals are also described.

DETAILED DESCRIPTION

Embodiments presented herein solve the problems of the present techniques by generating passenger paths tagged with transport modality in a given city in near real-time by correlating position and time information of subscriber-associated wireless telecommunications devices (e.g., user equipment (UE)) with position and time information of one or more vehicles. Thus, the position and time information from which the correlation may be garnered may include location information of subscribers gathered from mobile telecommunication networks or over-the-top (OTT) service providers and positioning information of public transport vehicles.

Some embodiments described herein employ a stochastic mathematical method on the position and time information in order to determine the public transport routes and vehicles the subscriber associated with a wireless communication device takes. The applied method generates a probabilistic distribution function of positions of the multiple subscriber telecommunications devices for each telecommunication cell and/or each telecommunication cell pairs between which cell changes occur, and based on heuristics, yields the public transport vehicles (e.g., specific bus service, subway train, etc.) that any given mobile subscriber is riding with the highest probability. If the subscriber is most probably not riding any public transport vehicles, then other heuristics are used to assign another modality such as walking, bicycle or car. Thus, by utilizing near-real-time position and location data associated with one or more wireless telecommunication devices and vehicles, detailed and continuously updated statistics can be obtained about actual traffic demand and actual public transport vehicle utilization. This detailed information can in turn be used to optimize the public transport system of a city or an agglomeration.

Figure 1:
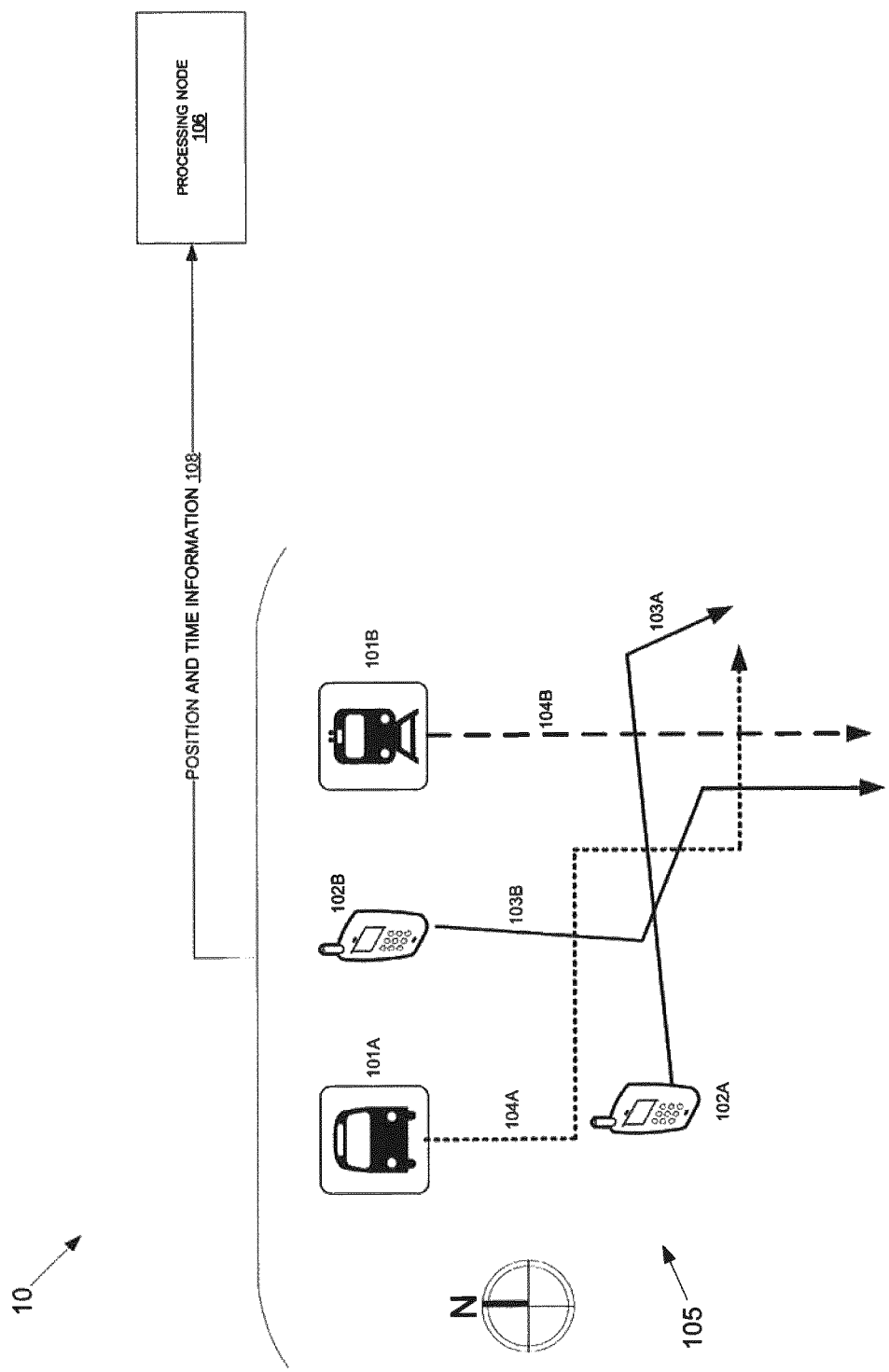
FIG. 1 is a block diagram of a system implementing aspects of one or more embodiments described herein.

FIG. 1 illustrates a communication system 10 according to one or more embodiments of the present disclosure. As shown in the Figure, the communication system 10 includes a processing node 106, which may receive position, position accuracy, position timestamp and other location-related information 108 from one or more of several sources. These sources may include one or more wireless communication networks or OTT service provider networks tracking the geographical location of wireless telecommunication devices and one or more public transport systems tracking the geographical location of vehicles. Other location-related information may include but is not limited to telecommunication cell identifiers and cell change events. In an aspect, from the received position and time information 108, the processing node 106 may correlate one or more vehicle paths 104 (including 104A and 104B) with multiple paths of subscriber telecommunication devices 102 (including 102A and 102B). The system 10 may include one or more wireless communication networks, systems, sub-systems, or the like, as well as one or more wireline communication networks, systems, sub-systems, or the like, or those that have both wireless and wireline communication functionality.

In the specific embodiment shown in FIG. 1, multiple vehicles 101, including a bus 101A and a subway train 1016, travel through a geographical area 105 along multiple paths 104 (i.e., 104A and 104B, respectively) corresponding to each of the multiple vehicles 101. Likewise, one or more wireless telecommunication devices 102, including 102A and 102B, may follow corresponding paths 103A and 103B through the geographic region 105. Position and time information 108 for the paths of the one or more subscriber telecommunications devices and the vehicles are obtained by the processing node 106 through one or more techniques disclosed in greater detail below.

In an aspect of the present disclosure, the processing node 106 can identify one or multiple vehicle paths 104, for instance, based on the obtained position and time information 108. Likewise, the processing node 106 can determine the one or multiple paths 103 traveled by multiple subscriber telecommunications devices 102 having one or more corresponding network or service providers. After identifying and determining these paths 103 and 104, the processing node 106 can correlate the paths 104 traveled by the multiple vehicles and the paths 102 traveled by the multiple subscriber telecommunications devices 102 to determine (e.g., estimate) which one or more modes of transportation (e.g., walking, bus, subway train, etc.) each subscriber telecommunications device 102 used over the path 103 traveled by the subscriber telecommunications device 102.

In at least some embodiments, the processing node 106 and subscriber telecommunications device 102 operate in wireless communication systems 10 that comprise an Evolved UMTS Terrestrial Radio Access Network (E-UTRAN) and widely known as the Long-Term Evolution (LTE) system, or in a 5G communication system, for example. However, it will be appreciated that the techniques may be applied to other wireless networks, as well as to successors of the E-UTRAN. Thus, references herein to signals using terminology from the 3GPP standards for LTE should be understood to apply more generally to signals having similar characteristics and/or purposes, in other networks.

A processing node 106 herein is any type of processing device capable of communicating with another node (i.e., other processing device) via wired communication or over the air via wireless communication using radio signals. In example embodiments, the processing node 106 can be a device in any network, such as but not limited to communication system 10. This may include devices in an access network and/or a core network, packet-switched networks and/or circuit switched networks, a public or private cloud and/or any other network type generally known in the art.

Subscriber telecommunications device 102 is any type device capable of communicating with a network using wired or wireless signals. These devices may include mobile telephones, smartphones, tablets, e-readers, laptops, wearables, or any other device that is generally mobile and configured to communicate via a wireless access network. As the subscriber telecommunications device 102 may be a user equipment, or "UE," in some examples, for purposes of the present disclosure, the subscriber telecommunications device 102 of FIG. 1 may be referred to herein as a UE.

A subscriber telecommunications device 102 may also be referred to as a radio device, a radio communication device, a wireless terminal, or simply a terminal. Unless the context indicates otherwise, the use of any of these terms is intended to include device-to-device UEs or devices, machine-type devices or devices capable of machine-to-machine communication, sensors equipped with a wireless device, wireless-enabled table computers, mobile terminals, smart phones, laptop-embedded equipped (LEE), laptop-mounted equipment (LME), USB dongles, wireless customer-premises equipment (CPE), etc. In the discussion herein, the terms machine-to-machine (M2M) device, machine-type communication (MTC) device, wireless sensor, and/or sensor, or any other device that may be utilized in an Internet-of-Things (IOT) system. Particular examples of such machines are power meters, industrial machinery, or home or personal appliances, e.g., refrigerators, televisions, personal wearables such as watches etc. In other scenarios, a wireless communication device as described herein may be comprised in a vehicle and may perform monitoring and/or reporting of the vehicle's operational status or other functions associated with the vehicle.

In addition, one or more of the subscriber telecommunications devices 102 can each be associated with a particular "subscriber" (may also be referred to as a "user" herein). In a non-limiting aspect, this subscriber is generally any registered and/or identifiable unit (human or otherwise) permitted to utilize a particular network (access network, core network, data network) and/or service provider (e.g., Netflix, Google, Amazon, and the like). The subscriber may be a device owner (human, company, company employee), mobile service consumer (Facebook user/account), or object, i.e., any physical or abstract "thing" that is capable of transport, such as a consumer product in the supply chain, a couriered document, a tour company tour group, item owned by a particular company, an employee, or generally any living or non-living entity that can correspond to a subscriber telecommunications device 102 whose path is tracked and identified by processing node 106. For purposes of the present disclosure, though the term "subscriber telecommunications device" is used to describe a mobile station, UE, and/or any mobile device carried in relatively close proximity to a subscriber, the term "subscriber" can also be used to refer to the subscriber telecommunications device 102 corresponding to the subscriber. In other words, as both the subscriber telecommunications device 102 and its corresponding subscriber(s) are likely to travel essentially the same path (i.e., the subscriber telecommunications device 102 maintains a relatively close proximity to the subscriber), the term "subscriber" herein can likewise optionally refer to the corresponding subscriber telecommunications device 102.

Ultimately, the processing node 106 identifies the paths travelled by one or multiple vehicles and determines paths travelled by one or multiple subscriber telecommunications devices 102 based on position and time data 108 obtained by the processing node 106 via at least one of several possible data sources discussed further below. Once the vehicle and subscriber paths have been obtained, the processing node 106 applies a stochastic mathematical method on the data in order to determine the likely vehicles of the one or multiple vehicles (for which paths were obtained) utilized by the one or more subscriber telecommunications devices 102 on their corresponding paths. The processing node 106 likewise builds a probabilistic distribution function of positions of the multiple subscriber telecommunications devices for each telecommunication cell and/or each telecommunication cell pairs between which cell changes occur based on the position and time data 108. Thereafter, the processing node 106 yields one or multiple vehicles (e.g., specific bus service, subway train, etc.) that any given subscriber telecommunications device 102 utilized along its corresponding path with a particular probability and/or degree of confidence, which may be relative (i.e., with the highest probability) or absolute (i.e., measured against a preconfigured or dynamic threshold value). If the processing node 106 determines, on the other hand, that a particular one of the subscriber telecommunications devices 102 likely did not utilize any public transport vehicles (again, can be in relative or absolute terms), other heuristics are used to assign a non-public-vehicle modality to the path or portion thereof (such as walking, bicycling, and/or using a car, for example). Ultimately, after multiple days (and/or multiple path iterations for the one or multiple subscriber telecommunications devices 102 and/or one or multiple vehicles 101), stored likelihood time series' and mapping results can be analyzed by the processing node 106 to render a long-term subscriber profile for the one or multiple subscribers.

Figure 2:
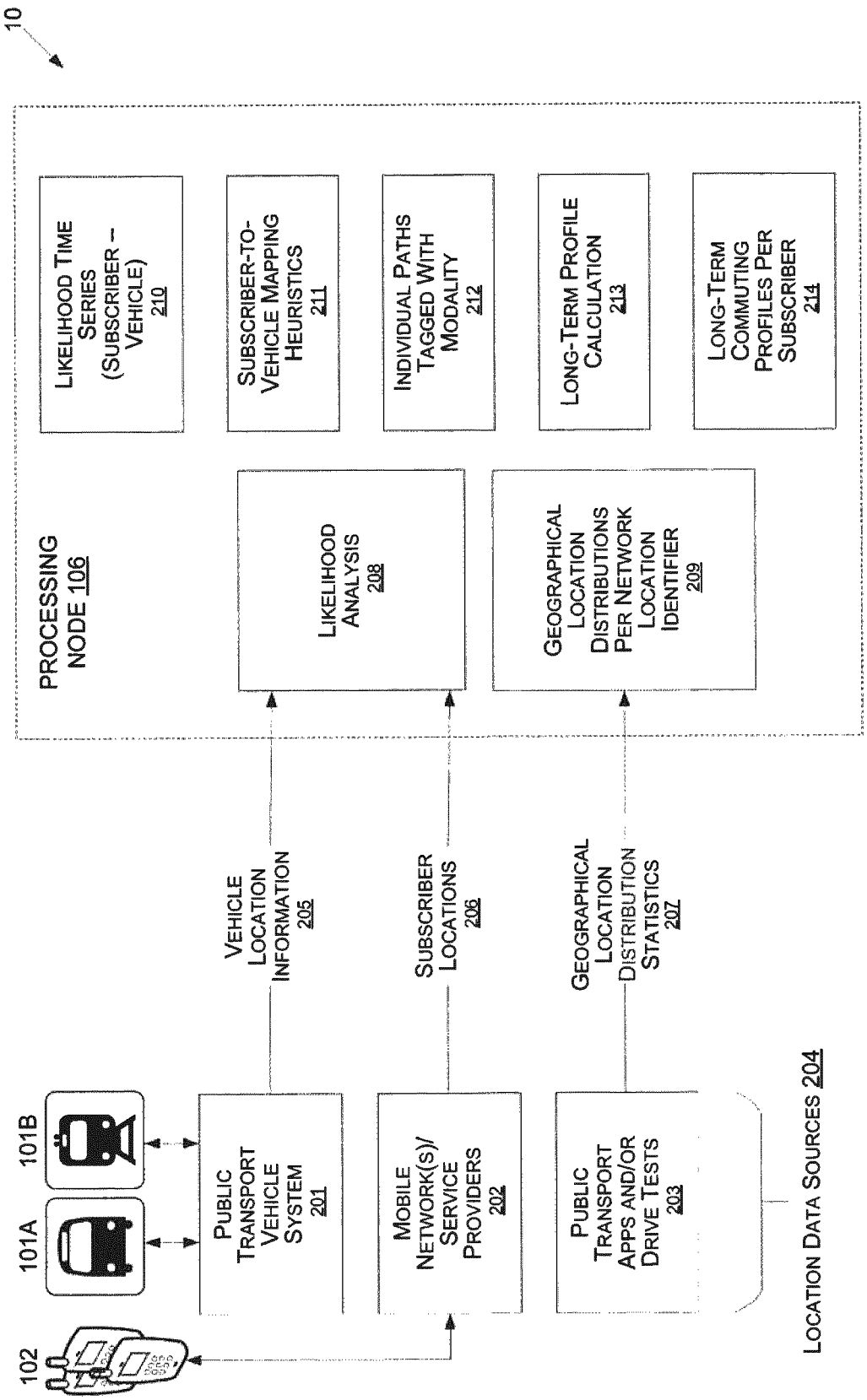
FIG. 2 is a block diagram of a system implementing aspects of one or more embodiments described herein.

FIG. 2 illustrates further aspects of the system 10 presented above in relation to FIG. 1, with particular detail provided for an example processing node 106 and the functionality thereof. In an aspect of example embodiments, the processing node 106 can receive several types of position and timing information 108 from several sources, each of which provides a particular advantage and unique insight into the subscriber-vehicle correlation process. Thus, one key feature that makes the present improvements possible is the availability of relatively fine-grained (e.g., at the cell or sub-cell level) mobile positioning information to subscribers, as well as GPS position and time information for public transport vehicles. These specific and non-limiting forms of position and time information 108 and the location data sources 204 providing this information will now be discussed.

First, as shown in FIG. 2, processing node 106 can receive vehicle location information 205 obtained and managed by a vehicle system, such as, but not limited to, a public transport vehicle system 201 that includes one more multiple vehicles, including 101A and/or 101B. In some examples, rather than a public transport vehicle system 201, the vehicle system may be a private vehicle system such as a taxi or automobile ridesharing fleet, bikeshare system, or the like. With respect to obtaining the vehicle location information 205 at the vehicle system 201, an increasing number of municipalities in the United States (and indeed the world) have real time public transport vehicle tracking systems whose data is generally available via one or more publicly-available Application Program Interfaces (APIs), such as the standard General Transit Feed Specification (GTFS)-real-time interface (or similar interface). In an aspect, this position and timing information for the vehicles in the vehicle system should be obtained to ensure that it is as accurate as possible, and therefore GPS-based systems are ideal though not required. In addition, the vehicle location information 205 is optimally provided with fine time granularity and is available for a maximum number of public transport vehicles, in the public transport vehicle system 201.

In addition to vehicle location information 205, the processing node 106 can also be provided with position and timing information 108 from one or more mobile networks and/or service providers 202 in the form of subscriber locations 206. Mobile network footprints are increasing throughout the world, providing further coverage reach for mobile positioning systems and providing increasingly more complete and accurate position and time information for subscriber telecommunications devices 102 (or "localization information"), e.g., densifying cell coverage improves location accuracy. For one, these modern mobile communication systems generate and expose position and time information more frequently than the legacy wireless communication systems (which implement call data record (CDR)-based techniques that limited generation of position and time information when establishing a phone call or sending/receiving user data communications (such as a text or media message)). Though modern wireless systems still require subscriber communication devices 102 to be active in order to generate and/or update position and time information, continuously increasing smartphone usage or penetration (e.g., frequency of location updates is continuously improving) and many applications performing regular background data transfers ensure frequent network activity for most users, which in turn increases position and timing information generation opportunities. Also, the Radio Access Network (RAN) of modern mobile telecommunication systems can be configured to generate detailed reports of any such network activities that can be used to estimate also sub-cell location, for example. This shortened effective interval between data generation triggering events provides more granular position and timing information to processing node 106, and thus a relatively faster generation rate for accurate localization information.

The subscriber locations 206 provided to processing node 106 may include the subscriber locations 206 in terms of a cell or sub-cell location, and as such, may provide less accurate and/or less precise information than locations provided by systems that use GPS (such as those providing the vehicle location information 205 for the vehicles). As such, to improve accuracy and precision with respect to the position and time information 108 of the subscriber telecommunications devices 102, if a particular vehicle system and/or public transport company has an available smartphone application (app) or the mobile network operator has performed drive tests in its network, GPS location data from this public transport app and/or the drive tests 203 and/or from any other sources can be further correlated with the cell- or sub-cell-based subscriber locations 206 to improve overall location accuracy in system 10. Based on this correlation, geographical location distribution statistics 207 can be generated for each cell, cell change relation or any other network-related location identifier and sent along to the processing node 106.

As shown in FIG. 2, the processing node 106 can use these geographical location distribution statistics 207 (and/or the raw GPS/cell location information in some instances) to form a geographical location distribution 209 for each cell, cell-change relation or any other network-related location identifier of the given network(s). The geographical location distribution 209 can be maintained in a database (at the processing node 106 or another device) that is built and updated continuously by processing node 106. The geographical location distribution 209 yields a probability distribution function of the position of a subscriber telecommunications device 102 given the measured position in a particular network. As such, the probability distribution function can incorporate the position and time information 108, including a geographical area and/or any temporal parameter, e.g., time of day, day of week, etc., in order to reflect the heterogeneous accuracy level of the various spatio-temporal measurements provided by the location data sources 204.

In addition to building and maintaining the geographical location distribution 209, the processing node 106 can include a component or module that calculates, based on the vehicle location information 205 and subscriber locations 206, the likelihood that a given subscriber telecommunications device 102 is riding a given vehicle (or utilizing a particular mode of transport), e.g., on a particular route segment, at a given point in time. Whenever subscriber position and time information 108 is available from the mobile network and/or service provider for a given subscriber, the likelihood analysis component or module 208 can determine the position of all nearby vehicles (including public transport vehicles, in some examples) by interpolating stored location and time information for the same timestamp, and a probability of the given subscriber telecommunications device 102 being at each known vehicle location is calculated based on the geographical location distribution database discussed above.

In addition, based on a likelihood time series 210 for specific mobile subscriber and vehicle combinations and public transport line data (such as stop locations for specific lines), maximum likelihood methods can be used by one or more processing components or modules of the processing node 106 to identify the most probable routes, paths, public transport line segments, etc. used by each subscriber. In other words, processing node 106 includes a component or module for performing subscriber-to-vehicle mapping heuristics 211 based on the likelihood time series 210. Furthermore, in some instances, additional heuristics may be applied to identify the start and end of subscriber paths 103. Furthermore, processing node 106 may be configured to optimize the results by filtering out unrealistic transportation scenarios, which may include, for example, frequent transfers between parallel lines on the same itinerary, walking between two subsequent stops instead of direct transfer between connecting lines, etc., given that such scenarios have an increased likelihood of error.

In addition, the processing node 106 may be configured with one or more processing modules/components to identify subscribers not using public transport, but instead using private modes of transportation, including cars, bicycles or other transport means. These results, along with any public vehicle system modality determinations resulting from the subscriber-to-vehicle heuristics 211 discussed above, may result in a database 212 of individual subscriber paths 103 that are tagged with one or more modes of transportation (or "modalities") utilized along each path. In some examples, paths may be broken down into two or more shorter pieces, or "segments," which may have a different modality than another segment of the path 103. Accordingly, the individual paths tagged with modality 212 may include, for each path, a plurality of segments that are tagged with different modalities (e.g., a particular subscriber utilizes a subway line for a first segment of a path and transfers to a bus line for a second segment of the path). Therefore, the processing node 106 may include one or more processing modules/components that maintain and/or output a database containing each individual mobile subscriber path, where each entry may include one or more of the following fields:

Anonymized subscriber ID
Path start (timestamp and location)
Path end (timestamp and location)
List of path segments tagged with transport means used
  Segment start: timestamp and location (and stop ID for public transport)
  Segment end: timestamp and location (and stop ID for public transport)
  Modality: public transport/car/bicycle/etc.
  (Line ID for public transport)
  (Vehicle ID for public transport)
  Confidence indicator Furthermore, the processing node 106 may, in a long-term profile calculation 213, optionally build and maintain long-term commuting profiles 214, where each profile corresponds to a particular subscriber. These long term profiles can be useful outputs for public transport planning and can also increase the accuracy of modality assignment for individual subscriber paths.

Thus, as outlined above, the processing node 106 is configured to generate and expose fine-grained information about transport modality and actual vehicle/transport lines used (i.e., for a given path and/or origin/destination pair, generally, not only an aggregate citizen number may be provided but also percentage shares for different transport modalities and actual public transport line combinations used). Also, the proposed solution provides this transport modality information in near real-time allowing also the analysis of shorter term dynamic changes in transport patterns. This enables transport optimization use cases not yet available with any previous solutions. For instance, by utilizing the information generated by the processing node 106, system operators can precisely track the real impact right after public transport line changes are implemented (e.g., how many people are leaving their cars at home and switching to a newly introduced public transport line or the opposite, switching back to cars after an inconvenient schedule modification). Also, the information allows operators to optimize replacement services during new construction, line improvements, or after unplanned service outages or accidents. The proposed solution may not require significant investments in many cases since mobile networks are available in each city of the world and public transport vehicle tracking systems are also more and more common in large cities.

Furthermore, the processing or functionality of processing node 106 may be considered as being performed by a single instance or device or may be divided across a plurality of single-device processing nodes 106 (each of which are configured to perform all or a portion of the example processing node 106 embodiments described herein) that may be present and in communication in a given network/environment, such that together the device instances perform all of the above-disclosed functionality. In addition, processing node 106 may be any known type of device or logical entity associated with a communication network, wireless communication network, wireline communication network, processing device external to a network infrastructure, a single processor, core, logical or software module/component, radio communication network, or content delivery network, generally, that is known to perform a given disclosed processes or functions thereof. Examples of such processing nodes include eNBs (or other types of base stations or access points), Mobility Management Entities (MMEs), gateways, servers, and the like. Furthermore, in some instances, processing node 106 may represent a cloud-based processing system or sub-system that employs one or more dedicated or dynamically allocated processing node 106 instances, which may be processing devices, processors, processing cores, virtual machines, memories, servers, and/or any other device utilized in network systems or subsystems configured to perform logical operations to execute the aspects of method 300 above, or a combination of any of these potential processing node types.

In view of the modifications and variations described above, FIG. 3 presents an example method 300 (and variations therefrom) for real-time or near-real-time transport modality statistics by correlating mobile network and service provider location data for subscribers with vehicle location data. For instance, at block 302 of method 300, a processing node 106 may identify paths traveled by multiple vehicles. In an aspect, these multiple vehicles may be associated with a public transportation system, a private transportation service, or the like. In a further aspect of method 300, at block 304, the processing node 106 can determine paths traveled by multiple subscriber telecommunications devices of one or more network or service providers. In addition, at block 306 of method 300, the processing node 106 can correlate the paths traveled by the multiple vehicles and the paths traveled by the multiple subscriber telecommunications devices to determine which one or more modes of transportation each subscriber telecommunications device used over the path traveled by the subscriber telecommunications device.

Figure 3:
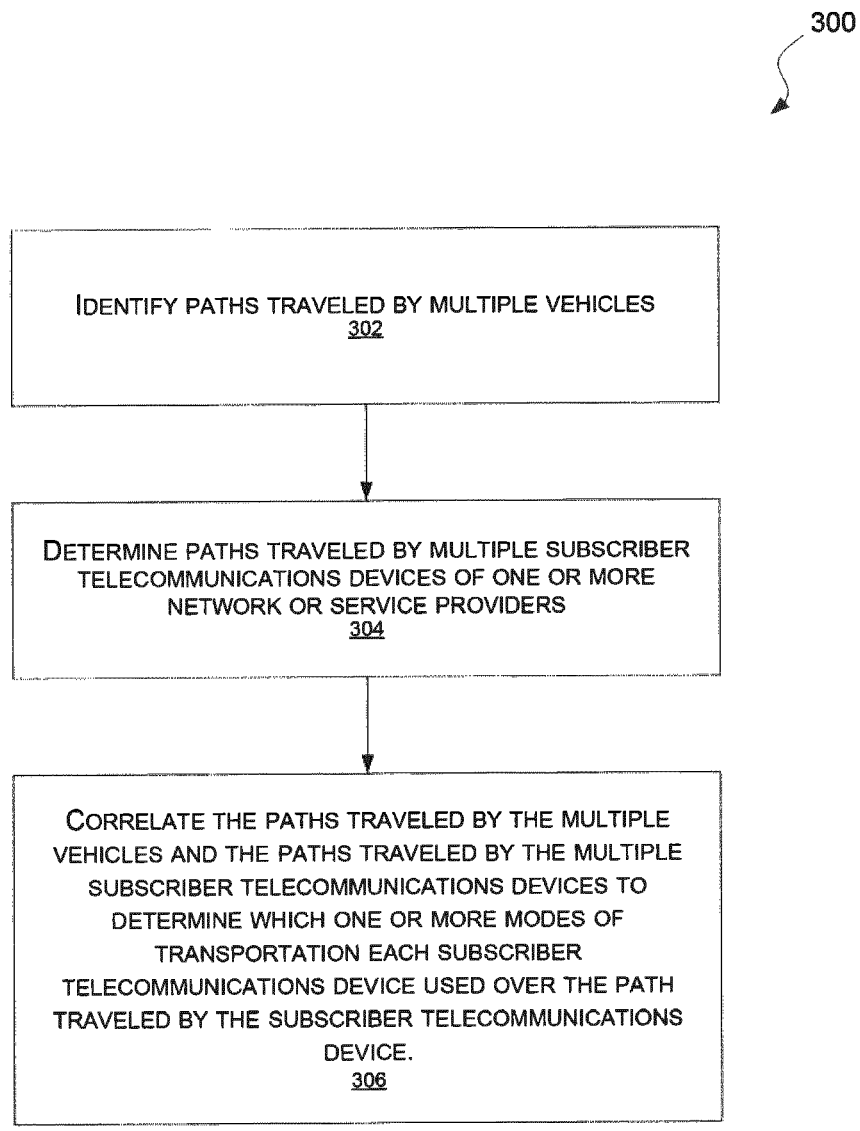
FIG. 3 is a logic flow diagram of a method implemented by a processing node according to one or more embodiments.

Furthermore, although not shown in FIG. 3, method 300 may include further aspects, including but not limited to those disclosed in one or more of the enumerated embodiments below, which include one or more of the following further additional and/or alternative aspects. For instance, in some examples, determining the paths traveled by multiple subscriber telecommunications devices at block 304 comprises obtaining, for each subscriber telecommunications device of the multiple subscriber telecommunications devices, location information that is obtained by the one or more network or service providers continuously and/or at regular intervals (i.e., periodically). In some examples, the paths traveled by the multiple vehicles are identified based on positioning information (i.e., position and time information 108 of FIG. 1) obtained from a public transport system, private transport/transportation system, or one or more individual vehicles.

In addition, in some examples, correlating the paths at block 306 may include generating a probabilistic distribution function of positions of the multiple subscriber telecommunications devices for each telecommunication cell and/or each telecommunication cell pair between which cell changes occur in the one or more network provider given accurate location information provided by mobile terminals. In some examples, correlating the paths may alternatively or additionally include calculating a likelihood that each of the multiple subscriber telecommunications devices 102 is riding in one of the multiple vehicles at one or more points in time. In an additional non-limiting example, calculating the likelihood can include interpolating the location of the vehicles at the one or more points in time when subscriber telecommunication device locations are available and determining the probability that a given subscriber telecommunications device is at a same location as a given vehicle at the one or more points in time.

In further example embodiments, method 300 may include the processing node 106 generating multiple probability time series for multiple combinations of subscriber telecommunications device and vehicle pairs based on the probabilities that the given subscriber telecommunications device is at a same location as the given vehicle at the one or more points in time. One or more examples may additionally or alternatively include identifying, from the probability time series for each subscriber telecommunications device, the one or more most probable vehicle line segments utilized by the subscriber associated with at least one of the one or more subscriber telecommunications devices. In some examples, the one or more most probable vehicle line segments utilized by the subscriber telecommunication devices are selected among the multiple probability time series based on public transport vehicle stop location data and/or are selected among the multiple probability time series based on one or more maximum likelihood methods.

In some examples of method 300, the selection of the one or more most probable vehicle line segments utilized by the subscriber telecommunication devices among the multiple probability time series can further include identifying a start and an end of paths of the one or more subscriber telecommunications devices, filtering one or more path segments that fall below a likelihood threshold, and/or identifying one or more path segments for subscriber telecommunications devices where they are likely traveling via non-public transport vehicles.

Moreover, additional or alternative examples of method 300 include generating a database comprising entries for each path of each of the subscriber telecommunications devices. In these examples, each of the entries can comprise one or more of a subscriber identifier, a path starting location, a path starting time, a path ending location, a path ending time, and/or a list of path segments. In some examples, the database comprises a corresponding transport modality for each of the path segments. In alternative or additional examples, each of the path segments include one or more of a segment starting location, a segment starting time, a segment starting stop, a segment ending location, a segment ending time, a segment ending stop, a mode of transportation used for the segment, a vehicle line identifier, a vehicle identifier; and/or one or more confidence indicators for one or more fields of a particular entry.

In addition, method 300 can additionally or alternatively include generating a mobility profile for each of the subscriber telecommunications devices using the database. Certain embodiments may further include generating a probabilistic usage profile associated with at least one of the multiple vehicles and/or public transport lines. Method 300 may further include generating, from the traffic demand, additional traffic demands (e.g., drilling down the traffic demand into sub-traffic demands) for each origin-destination pair per transport modality.

Note that the processing node 106 as described above may perform processing to perform any of the above aspects by implementing any functional means or units. In one embodiment, for example, the processing node 106 comprises respective circuits configured to perform the steps of method 300 shown in FIG. 3 as well as the alternative or additional steps/aspect outlined above. The circuits in this regard may comprise circuits dedicated to performing certain functional processing and/or one or more microprocessors in conjunction with memory. In embodiments that employ memory, which may comprise one or several types of memory such as read-only memory (ROM), random-access memory, cache memory, flash memory devices, optical storage devices, etc., the memory stores program code that, when executed by the one or more microprocessors, carries out the techniques described herein.

Figure 4A:
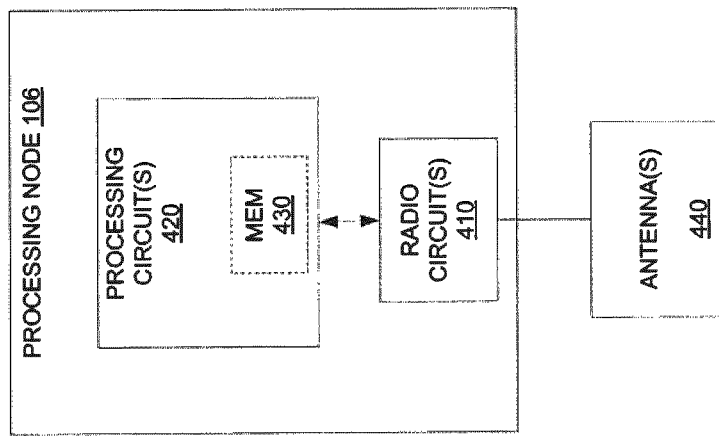
FIG. 4A is a block diagram of a processing node according to one or more embodiments.

FIG. 4A illustrates additional details of a processing node 106 in accordance with one or more embodiments. As shown, the processing node 106 includes one or more processing circuits 420 and, optionally, can include one or more radio circuits 410. The one or more radio circuits 410 are configured to transmit via one or more antennas 440. The one or more processing circuits 420 are configured to perform processing described above, e.g., in FIGS. 1-3, such as by executing instructions stored in memory 430.

Figure 4B:
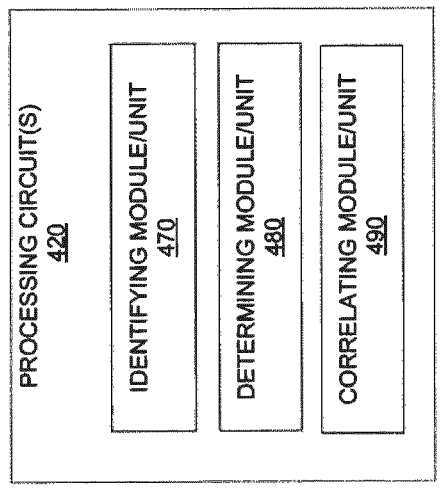
FIG. 4B is a block diagram illustrating example aspects of processing circuits of a processing node according to one or more embodiments.

FIG. 4B illustrates further aspects of the one or more processing circuits 420, which may implement certain functional means or units corresponding to aspects of method 300 described above. Note that although FIG. 4B illustrates three particular modules/units, they are not exclusive or limiting. Instead, the one or more processing circuits 420 may include additional modules/units or other processing circuits to perform any of the aspects of the disclosure introduced above. As shown, the processing circuit(s) 420 may implement an identifying module/unit 470 for identifying paths traveled by multiple vehicles, e.g., as described above for block 302 of method 300. Additionally, processing circuits 420 may include a determining module/unit 480 for determining paths traveled by multiple subscriber telecommunications devices of one or more network or service providers, e.g., as described above for block 304 of method 300. In addition, processing circuits 420 can include a correlating module/unit 490 for correlating the paths traveled by the multiple vehicles and the paths traveled by the multiple subscriber telecommunications devices to determine which one or more modes of transportation each subscriber telecommunications device used over the path traveled by the subscriber telecommunications device, e.g., as described above for block 306 of method 300.

Figure 5:
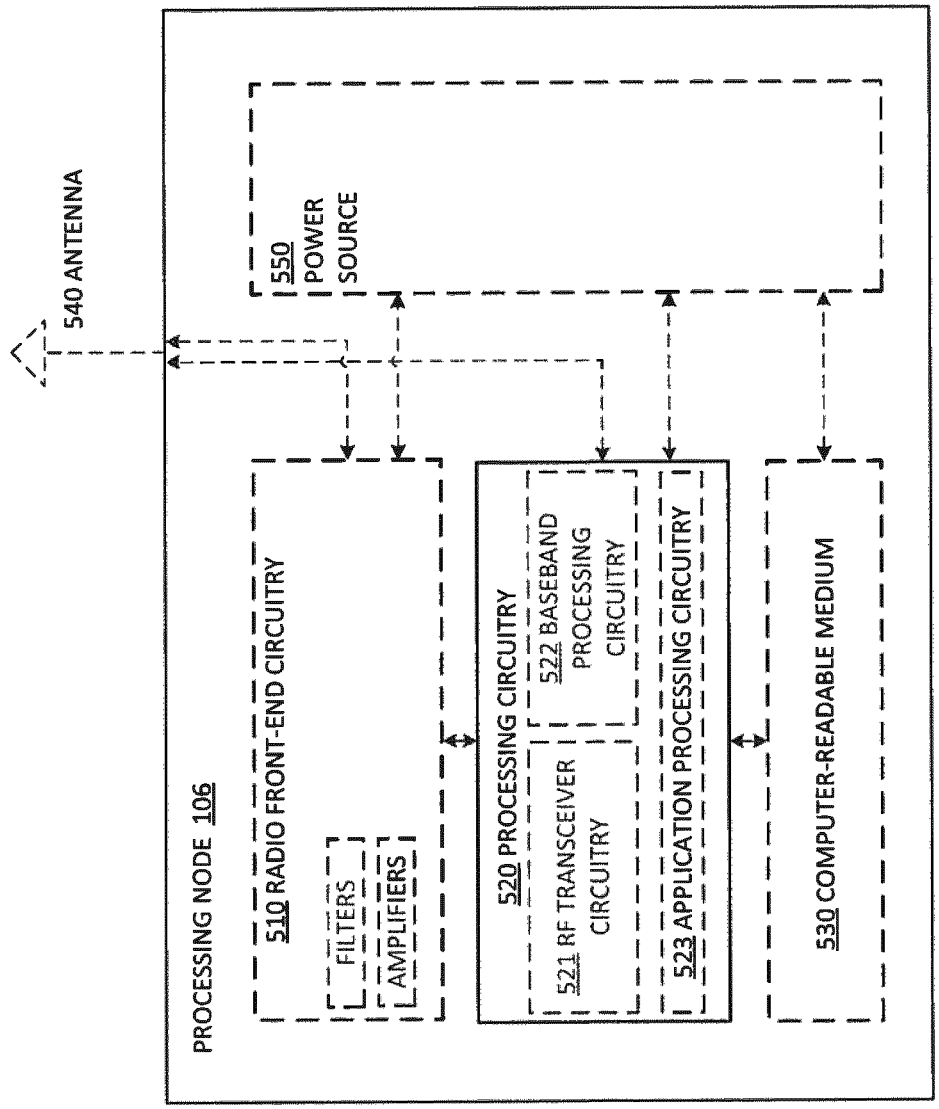
FIG. 5 is a block diagram illustrating example aspects of a processing node according to one or more embodiments.

Additional details of the processing node 106 are shown in relation to FIG. 5. As shown in FIG. 5, the example processing node 106 includes an antenna 540, radio circuitry (e.g., radio front-end circuitry) 510, processing circuitry 520, and the processing node 106 may also include a memory 530. The processing circuitry 520, which may correspond to the one or more processing circuits 420 of FIGS. 4A and/or 4B, may be configured to perform any of the aspects of method 300 of FIG. 3 discussed above, and any other aspects discussed herein, generally. The memory 530 may be separate from the processing circuitry 520 or an integral part of processing circuitry 520. Antenna 540 may include one or more antennas or antenna arrays, and is configured to send and/or receive wireless signals, and is connected to radio circuitry (e.g., radio front-end circuitry) 510. Where processing node 106 does not include wireless communication capability, or even where it does, the processing node 106 includes communication circuitry for communication over one or more wires, transmission lines, busses, or other physical media. In certain alternative embodiments, processing node 106 may not include antenna 540, and antenna 540 may instead be separate from processing node 106 and be connectable to processing node 106 through an interface or port.

The radio circuitry (e.g., radio front-end circuitry) 510 may comprise various filters and amplifiers, is connected to antenna 540 and processing circuitry 520, and is configured to condition signals communicated between antenna 540 and processing circuitry 520. In certain alternative embodiments, processing node 106 may not include radio circuitry (e.g., radio front-end circuitry) 510, and processing circuitry 520 may instead be connected to antenna 540 without front-end circuitry 510.

Processing circuitry 520 may include one or more of radio frequency (RF) transceiver circuitry, baseband processing circuitry, and application processing circuitry. In some embodiments, the RF transceiver circuitry 521, baseband processing circuitry 522, and application processing circuitry 523 may be on separate chipsets. In alternative embodiments, part or all of the baseband processing circuitry 522 and application processing circuitry 523 may be combined into one chipset, and the RF transceiver circuitry 521 may be on a separate chipset. In still alternative embodiments, part or all of the RF transceiver circuitry 521 and baseband processing circuitry 522 may be on the same chipset, and the application processing circuitry 523 may be on a separate chipset. In yet other alternative embodiments, part or all of the RF transceiver circuitry 521, baseband processing circuitry 522, and application processing circuitry 523 may be combined in the same chipset. Processing circuitry 520 may include, for example, one or more central processing units (CPUs), one or more microprocessors, one or more application specific integrated circuits (ASICs), and/or one or more field programmable gate arrays (FPGAs).

The processing node 106 may include a power source 550. The power source 550 may be a battery or other power supply circuitry, including wired/dedicated power, as well as power management circuitry. The power supply circuitry may receive power from an external source. A battery, other power supply circuitry, and/or power management circuitry are connected to radio circuitry (e.g., radio front-end circuitry) 510, processing circuitry 520, and/or memory 530. The power source 550, battery, power supply circuitry, and/or power management circuitry are configured to supply processing node 106, including processing circuitry 520, with power for performing the functionality described herein.

In the following, test results of exemplary tests which have been performed using the technique presented herein are described with reference to FIGS. 6a to 6d. The tests have been performed on live data in a larger city to validate the feasibility of the proposed concept. In these tests, a user has queried two Android test terminals. In the first terminal, a custom-built Android app collected location information of nearby public transport vehicles using an HTTP-based API that the official app of the public transport company in this city used. In parallel, for the other test terminal, location data was collected from the mobile network. The second test terminal was occasionally used for checking web sites but was also idle for longer periods.

Figure 6A:
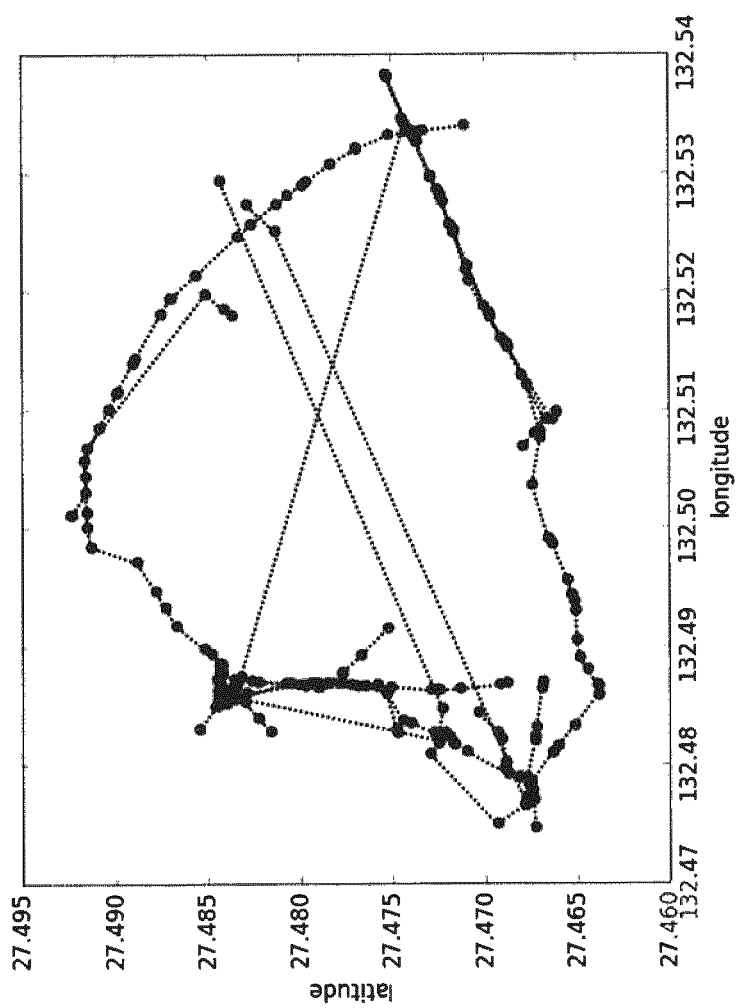
FIGS. 6a to 6d are diagrams illustrating test results of exemplary tests performed using the technique of the present disclosure.
Figure 6B:
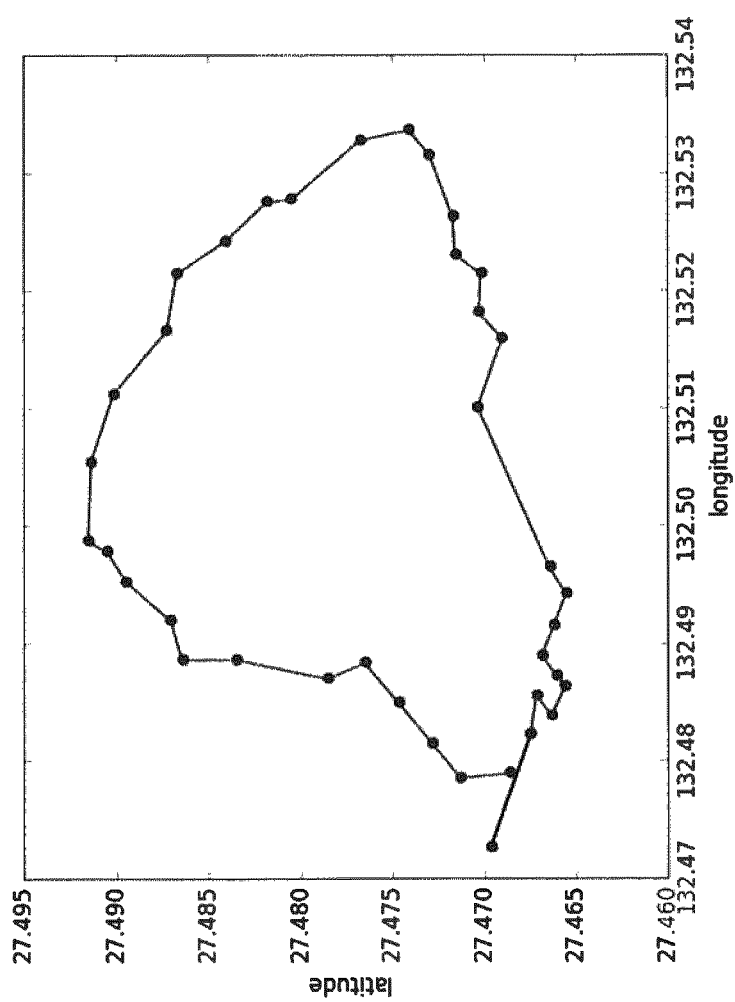
Figure 6C:
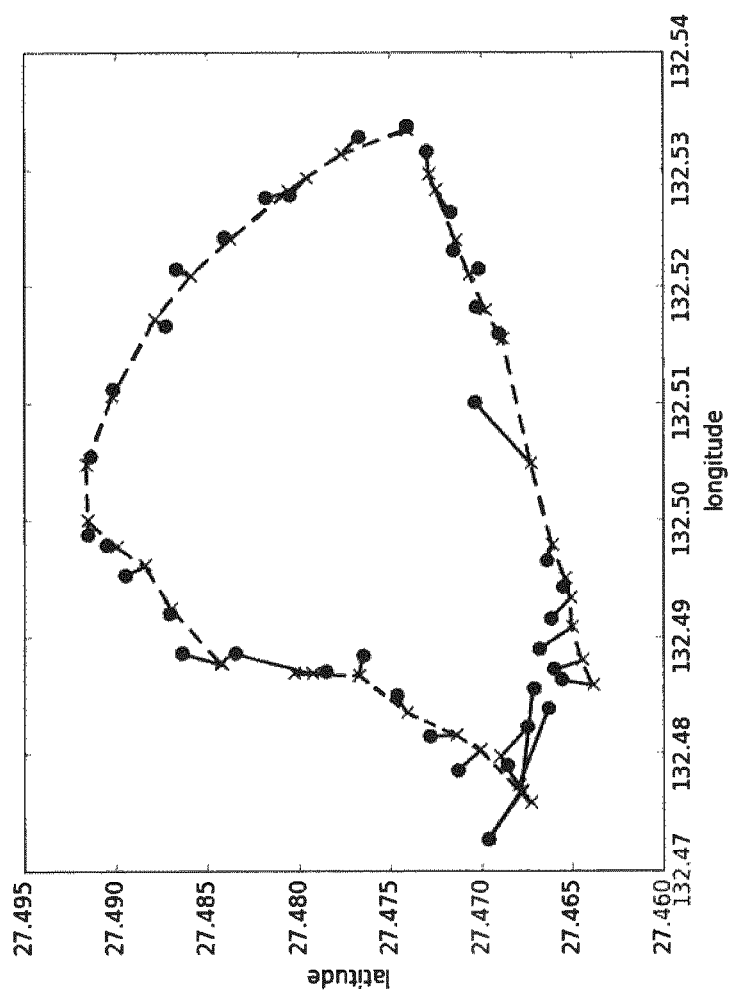
Figure 6D:
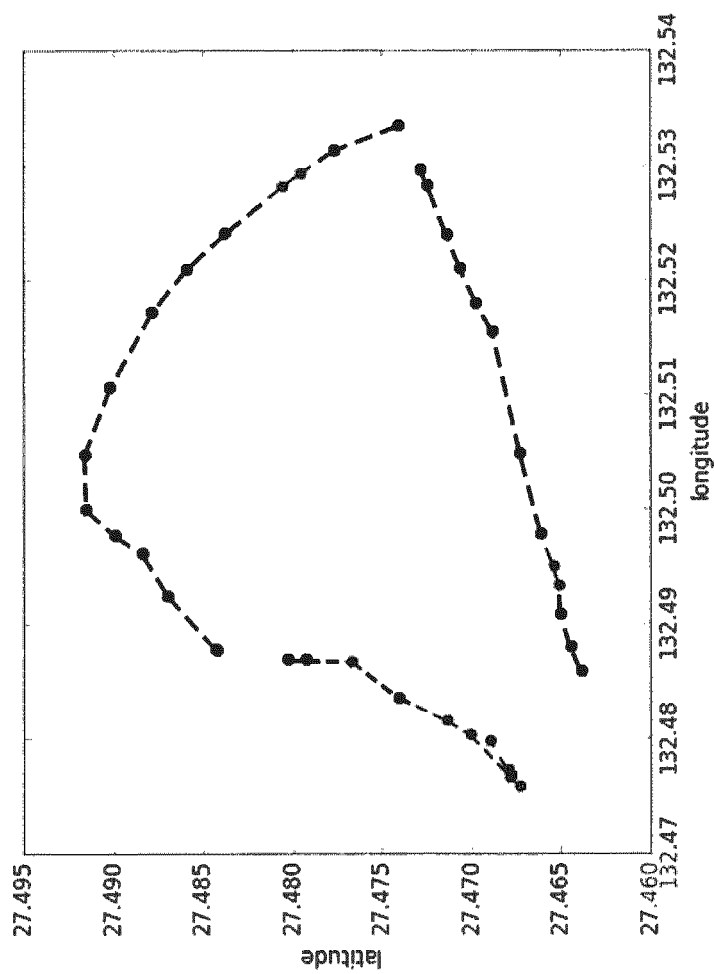

The diagrams of FIGS. 6a to 6d visualize different processing steps in the prototype implementation for a circular test path in the larger city (note: actual lat/lon coordinates are offset in order not to reveal the identity of the public transport company and the mobile network). Among the diagrams, FIG. 6a shows recorded locations of public transport vehicles in the proximity of the test user, FIG. 6b shows recorded locations of the test user from the mobile network, FIG. 6c shows a mapping of the test user to public transport vehicles, and FIG. 6d shows the final results of the proposed technique.

Figure 7:
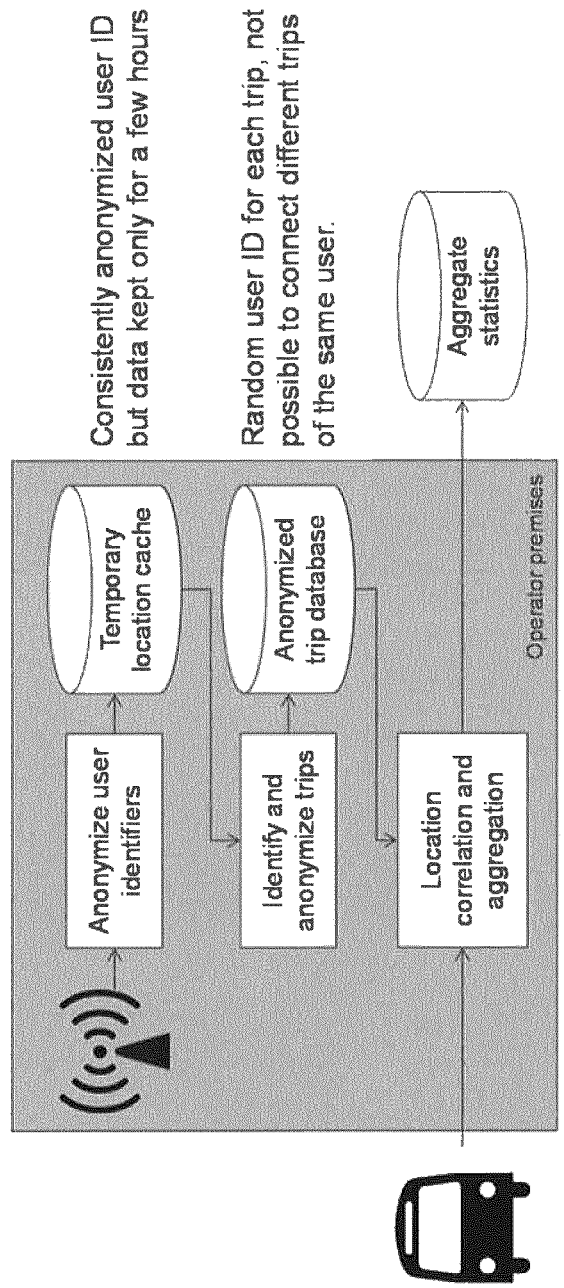
FIG. 7 illustrates a multi-layer anonymization schema for protecting privacy of individuals when using the technique of the present disclosure.

In a further consideration of the technique presented herein, it is noted that using location data of individuals from telecom networks may have privacy aspects. FIG. 7 therefore illustrates a multi-layer anonymization schema which may be used to protect the privacy of all individuals.

Figure 8:
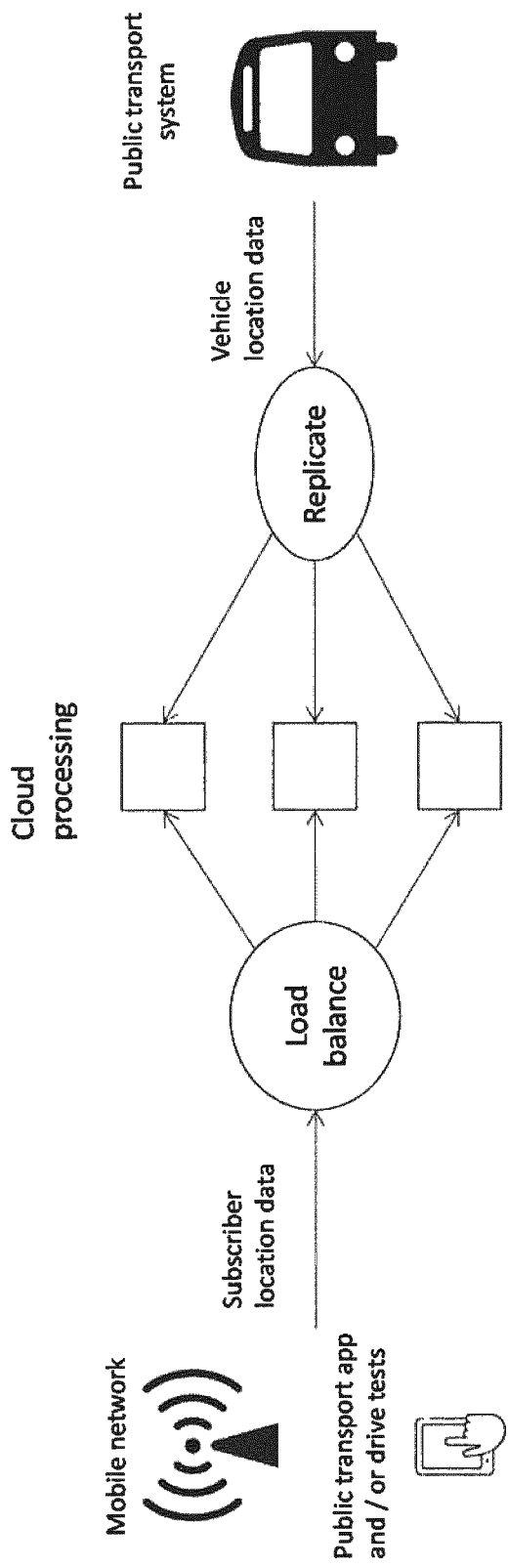
FIG. 8 schematically illustrates an approach for processing the technique of the present disclosure utilizing scaling options in a cloud environment.

Still further, it is noted that the proposed system may involve processing of huge amounts of mobile network data, typically from millions of mobile network subscribers. In contrast, vehicle location data may be orders of magnitudes smaller, typically covering thousands of vehicles. This may allow scaling options in a cloud environment: subscriber location data from mobile networks can be load balanced based on a hash of an anonymized subscriber ID and processed independently from each other in separate instances while vehicle location data can be simply replicated towards all individual instances (much smaller volume). Such approach is schematically illustrated in FIG. 8.

Though not explicitly described above, the present disclosure envisions further example embodiments that may be related to aspects of the above-described embodiments. As such, the above-described embodiments are not limiting. What is more, additional or alternative embodiments associated with or performed by the processing node 106 or subscriber telecommunications device 102 may be utilized in some implementations.

Those skilled in the art will also appreciate that embodiments herein further include corresponding computer programs. A computer program comprises instructions which, when executed on at least one processor of a node, cause the node to carry out any of the respective processing described above. A computer program in this regard may comprise one or more code modules corresponding to the means or units described above. Embodiments further include a carrier containing such a computer program. This carrier may comprise one of an electronic signal, optical signal, radio signal, or computer readable storage medium.

Those skilled in the art will recognize that the present invention may be carried out in other ways than those specifically set forth herein without departing from essential characteristics of the invention. The present embodiments are thus to be considered in all respects as illustrative and not restrictive, and all changes coming within the meaning and equivalency range of the appended claims are intended to be embraced therein.

The invention claimed is:

1. A method, comprising:
   identifying paths traveled by multiple vehicles;
   determining paths traveled by multiple subscriber telecommunications devices of one or more network or service providers;
   correlating the paths traveled by the multiple vehicles and the paths traveled by the multiple subscriber telecommunications devices to determine which one or more modes of transportation each subscriber telecommunications device used over the path traveled by the subscriber telecommunications device; and
   wherein correlating the paths comprises generating a probabilistic distribution function of positions of the multiple subscriber telecommunications devices for each telecommunication cell and/or each telecommunication cell pair between which cell changes occur given location information provided by mobile terminals, and based on heuristics, determining one or more vehicles that any given subscriber telecommunication device utilized along its corresponding path with a predetermined probability and/or degree of confidence.

2. The method of claim 1, wherein the determining the paths traveled by multiple subscriber telecommunications devices comprises obtaining, for each subscriber telecommunications device of the multiple subscriber telecommunications devices, location information that is obtained by the one or more network or service providers continuously and/or at regular intervals.

3. The method of claim 1, wherein the paths traveled by the multiple vehicles are identified based on positioning information obtained from a public transport system.

4. The method of claim 1, wherein the correlating the paths comprises calculating a likelihood that each of the multiple subscriber telecommunications devices is riding in one of the multiple vehicles at one or more points in time.

5. The method of claim 4, wherein the calculating the likelihood comprises:
   interpolating the location of the vehicles at the one or more points in time when subscriber telecommunication device locations are available; and
   determining the probability that a given subscriber telecommunications device is at a same location as a given vehicle at the one or more points in time.

6. The method of claim 4, further comprising generating multiple probability time series for multiple combinations of subscriber telecommunications device and vehicle pairs based on the probabilities that the given subscriber telecommunications device is at a same location as the given vehicle at the one or more points in time.

7. The method of claim 6, further comprising identifying, from the probability time series for each subscriber telecommunications device, one or more most probable vehicle line segments utilized by the subscriber associated with at least one of the one or more subscriber telecommunications devices.

8. The method of claim 7, wherein the one or more most probable vehicle line segments utilized by the subscriber telecommunication devices are selected among the multiple probability time series based on public transport vehicle stop location data.

9. The method of claim 7, wherein the one or more most probable vehicle line segments utilized by the subscriber telecommunication devices are selected among the multiple probability time series based on one or more maximum likelihood methods.

10. The method of claim 8, wherein the selection of the one or more most probable vehicle line segments utilized by the subscriber telecommunication devices among the multiple probability time series comprises:
    identifying a start and an end of paths of the one or more subscriber telecommunications devices;
    filtering one or more path segments that fall below a likelihood threshold; and/or identifying one or more path segments for subscriber telecommunications devices where they are likely traveling via non-public transport vehicles.

11. The method of claim 1, further comprising generating a database comprising entries for each path of each of the subscriber telecommunications devices, wherein each of the entries comprises:
   a subscriber identifier;
   a path starting location;
   a path starting time;
   a path ending location;
   a path ending time; and/or
   a list of path segments.

12. The method of claim 11, wherein the database comprises, for each of the path segments, a corresponding transport modality.

13. The method of claim 12, wherein the database comprises, for each of the path segments:
   a segment starting location;
   a segment starting time;
   a segment starting stop;
   a segment ending location;
   a segment ending time;
   a segment ending stop;
   a mode of transportation used for the segment;
   a vehicle line identifier;
   a vehicle identifier; and/or
   one or more confidence indicators for one or more fields of a particular entry.

14. The method of claim 11, further comprising generating a mobility profile for each of the subscriber telecommunications devices using the database.

15. The method of claim 11, further comprising generating a probabilistic usage profile associated with at least one of the multiple vehicles or public transport lines.

16. The method of claim 11, further comprising generating an origin-destination matrix indicating traffic demand as a function of time.

17. The method of claim 16, further comprising generating, from the traffic demand, additional traffic demands for each origin-destination pair per transport modality.

18. A processing node, comprising:
   processing circuitry;
   memory containing instructions executable by the processing circuitry whereby the processing node is operative to:
      identify paths traveled by multiple vehicles;
      determine paths traveled by multiple subscriber telecommunications devices of one or more network or service providers;
      correlate the paths traveled by the multiple vehicles and the paths traveled by the multiple subscriber telecommunications devices to determine which one or more modes of transportation each subscriber telecommunications device used over the path traveled by the subscriber telecommunications device; and
   wherein to correlate the paths, the instructions are executable by the processing circuitry whereby the processing node is further operative to generate a probabilistic distribution function of positions of the multiple subscriber telecommunications devices for each telecommunication cell and/or each telecommunication cell pair between which cell changes occur given location information provided by mobile terminals, and based on heuristics, determine one or more vehicles that any given subscriber telecommunication device utilized along its corresponding path with a predetermined probability and/or degree of confidence.

19. A non-transitory computer readable recording medium storing a computer program product for controlling a processing node, the computer program product comprising software instructions which, when run on processing circuitry of the processing node, causes the processing node to:
   identify paths traveled by multiple vehicles;
   determine paths traveled by multiple subscriber telecommunications devices of one or more network or service providers;
   correlate the paths traveled by the multiple vehicles and the paths traveled by the multiple subscriber telecommunications devices to determine which one or more modes of transportation each subscriber telecommunications device used over the path traveled by the subscriber telecommunications device; and
   wherein to correlate the paths, the software instructions, which when run on processing circuitry of the processing node, further causes the processing node to generate a probabilistic distribution function of positions of the multiple subscriber telecommunications devices for each telecommunication cell and/or each telecommunication cell pair between which cell changes occur given location information provided by mobile terminals, and based on heuristics, determine one or more vehicles that any given subscriber telecommunication device utilized along its corresponding path with a predetermined probability and/or degree of confidence.

* * * * *